(12) United States Patent
Wang

(10) Patent No.: US 6,522,748 B1
(45) Date of Patent: *Feb. 18, 2003

(54) ADJUSTABLE SUPPORTING FRAME

(76) Inventor: Chin-Yang Wang, No. 271, Zhen Chyan Street, Shul Lin, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,564

(22) Filed: Apr. 5, 2000

(51) Int. Cl.⁷ .............................................. H04M 1/00
(52) U.S. Cl. ...................................... 379/446; 379/454
(58) Field of Search ................................ 379/454, 455, 379/446; 248/278.1

(56) References Cited

U.S. PATENT DOCUMENTS 5,109,411 A * 4/1992 O'Connell .................. 379/454
6,244,553 B1 * 6/2001 Wang ......................... 379/454

* cited by examiner

*Primary Examiner*—Jack Chiang
(74) *Attorney, Agent, or Firm*—Troxell Law Office PLLC

(57) ABSTRACT

An adjustable supporting frame is composed of a base, a turnable arm, and a face engaging part. The base has a base central hole, and a base ring with engaging teeth on an end thereon. The turnable arm further is composed of an inner arm, an outer arm, and a teeth shaft engaging both of the arms together. The inner arm at an end thereof is corresponding to the base ring and has engaging teeth to mesh with the teeth on the base ring. The other end of the inner arm has a sleeve with an inner through hole. The outer arm at an end thereof has engaging teeth and at the other end thereof has outer plates. One of the outer plates has engaging teeth. The face engaging part engages with the outer arm by way of a screw rod, has a face ring with engaging teeth to mesh with teeth on the outer arm.

6 Claims, 3 Drawing Sheets

ADJUSTABLE SUPPORTING FRAME

BACKGROUND OF THE INVENTION

1. Field of The Invention

The present invention relates to an adjustable supporting frame, and particularly to an adjustable supporting frame possible to perform all spatial movements.

2. Description of Related Art

A supporting frame is frequently applied to engage with an article with another article and there are different supporting frames, which offer for engaging different articles. Especially, a variety of products are made under highly developed science and technology nowadays and it is much more possible for the products to have chances engaging with each other by way of a supporting frame accordingly.

For instance, a mobile phone is a very popular product but the main body thereof is designed to be an integral piece without considering the portability and the convenience. Therefore, it is often needed for the mobile phone to have an aid of support device especially when the holder is driving a car. Thus, how to place the mobile phone safely in a car by way of a support device is a key subject has to be cared virtually.

The present inventor has developed a lot of different types of supporting frames to fit different requirements. For instance, in order to place a mobile phone in a car, a supporting frame has been made to fix on the floor, to be located at the outlet of conditioned air, and etc.

Besides, the monitor in a satellite cruise guiding system is an another example. When the monitor is going to be fixed in a car, a supporting frame is required between the monitor and the body. It is necessary to consider the car model and the operator's location such that factors to form a supporting frame such as the length, the height, the angular location, and the orientation have to be made adjustable. By the same token, in order to satisfy the user's operation need, the same factors also have to be considered for a support device of a mobile phone.

SUMMARY OF THE INVENTION

An object of the present invention is to provide an adjustable supporting frame, which is possible to offer spatial movements to meet all possible requirements regarding space and angular considerations.

BRIEF DESCRIPTION OF THE DRAWINGS

The present invention can be more fully understood by referring to the following description and accompanying drawing, in which.

DETAILED DESCRIPTION OF THE PREFERRED EMBODIMENTS

Figure 1:
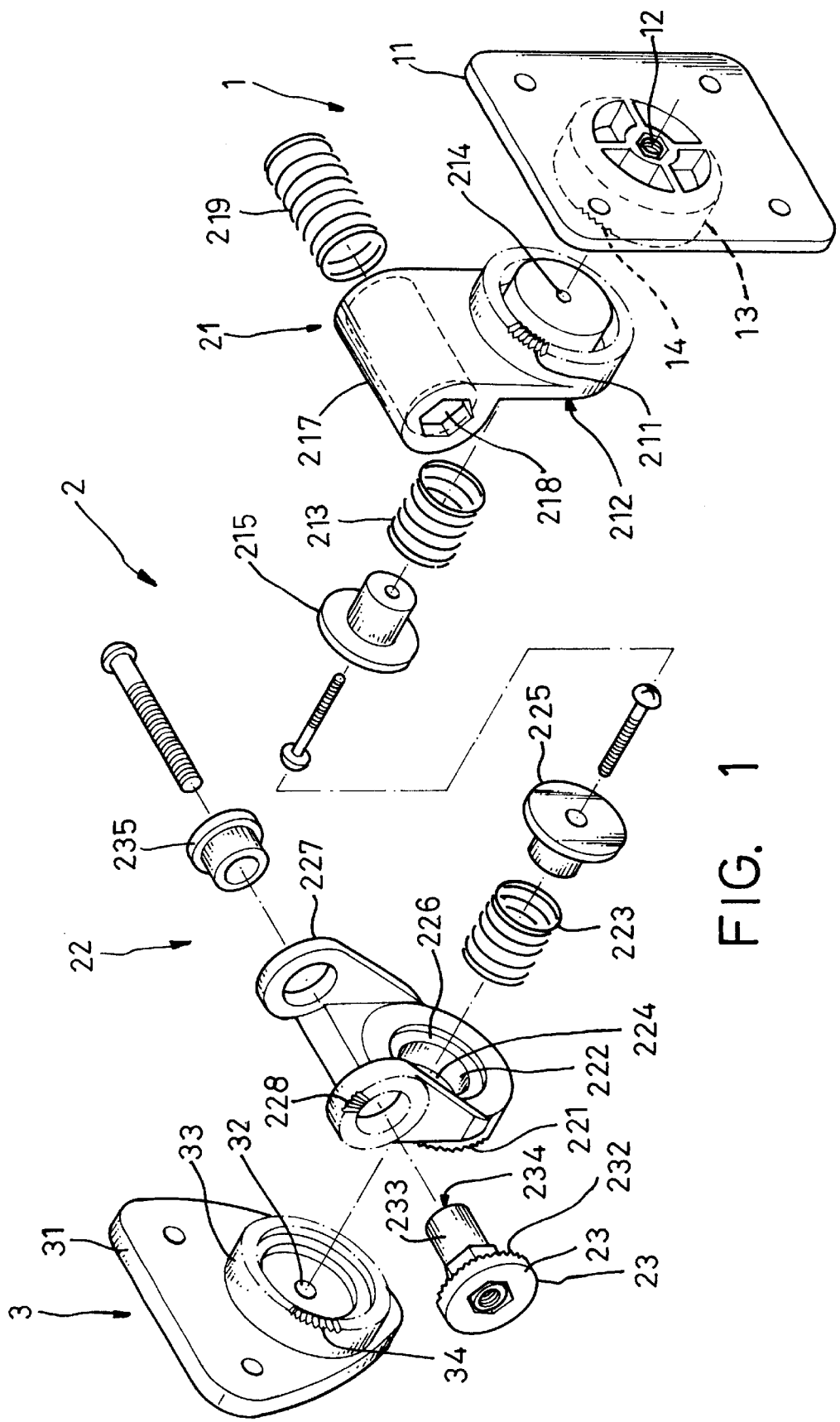
FIG. 1 is an exploded perspective view of an adjustable supporting frame in accordance with the present invention.
Figure 2:
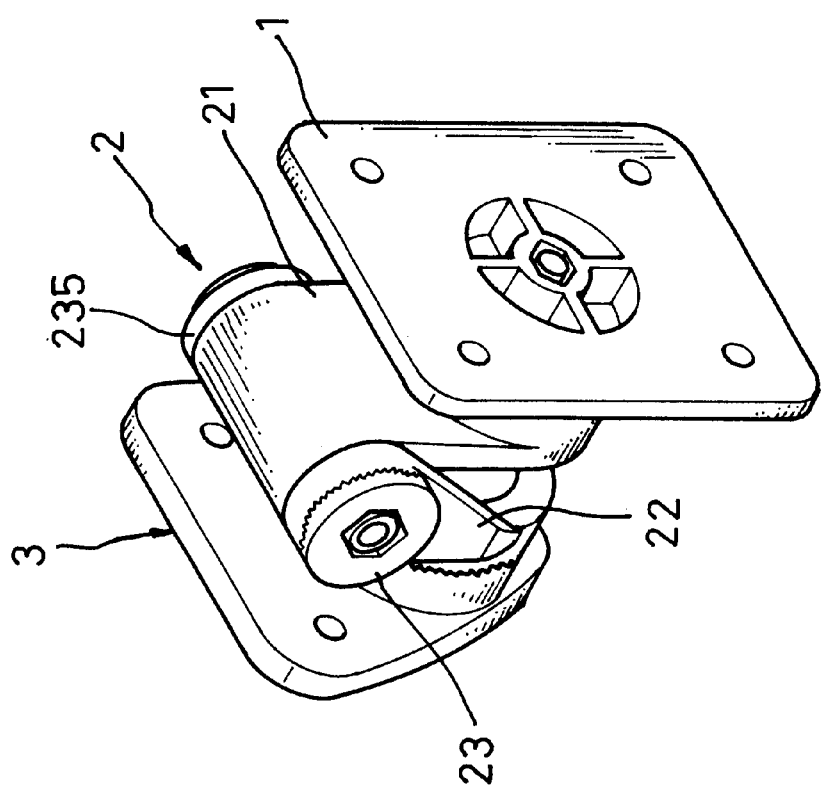
FIG. 2 is an assembled perspective view of the adjustable supporting frame shown in FIG. 1.

Referring to FIGS. 1, and 2, basically, an adjustable supporting frame according to the present invention comprises a base 1, a turnable arm 2, and a face engaging part 3.

The base 1 is used for engaging with the connected part such as the internal part of a car and the base 1 has an engaging base 11, which can be a plate with engaging holes as shown in FIG. 1 or with hanging hooks at the back thereof. The central part of the engaging base 11 is a central opening 12 with an integral base ring 13. T he base ring 13 at the outer end thereof is provided with facial teeth 14 to mesh with the turnable arm 2.

The turnable arm 2 is composed of an inner arm 21, an outer arm 22, and a teeth shaft 23 and the inner arm 21 and the outer arm 22 are fitted with each other and pivotally engage with the teeth shaft 23. An end of the inner arm 21 has a size corresponding to the base ring 13 is provided with inner facial teeth 211 to mesh with the facial teeth 14 on the base ring 13. In order to increase the tightness, a closed inner recess chamber 212 is formed at the opposite side of the facial teeth 211 for receiving a spring 213. (The chamber 212 is unable to show in the figure because of projecting angle, however, it can be referenced to the outer arm 22.) An inner hole 214 is provided at the center of the end and the size of the inner hole 214 is corresponding to the base opening 12. An inner cap 215 has a central hole passed through by a screw such that the inner cap 215 can bias against the spring 213 to engage with the base ring 13 so as to allow the facial teeth 14 meshing with the inner facial teeth 214. The inner cap 215 has a size corresponding to the inner recess chamber 212 and can press an inner neck 216 formed by a large diameter part and a small diameter part in the recess chamber 212. (The inner neck 216 is unable to show in the figure because of projecting angle, however, it can be referenced to the outer arm 22.)

The inner arm 21 at anther end thereof is a inner sleeve 217 with a sleeve hole 218 at the center thereof. In order to increase the friction force, a spring 219 can be received in the sleeve hole 218.

The outer arm 22 at an end thereof is provided with outer facial teeth 221 and the outer facial teeth 221 have the same size as the inner facial teeth 211. A closed outer recess chamber 222 is formed at the opposite side of the outer facial teeth 211 for receiving a spring 223 and an outer hole 224 at the central part thereof is provided for receiving an outer cap 225. The outer cap 225 has a central hole passed through by a screw. An outer neck 226 is formed between the outer hole 224 and a larger hole beside the outer hole 224 such that the outer cap 225 can press the outer neck 226 and bias against the spring 223 while engaged in the outer chamber 222.

The outer arm 22 at another end thereof is formed two outer plates 227 and one of the outer plates 227 has lateral facial teeth 228. The space between the outer plates 227 is corresponding to the inner sleeve 217 such that the inner sleeve 217 can be disposed therein accordingly.

A teeth shaft 23 is a screw rod and a cap 231 thereof has inner cap teeth 232 for meshing with the lateral teeth 228. A rod part 233 extends out of the cap 231 perpendicularly with an axial hole 234. An end of the teeth shaft 23 is blocked by a shaft plug 235 to allow a screw bar passing through. Thus, the outer plates 227 and the inner sleeve 217 can be engaged with each other and the inner cap teeth 228 is in a state of meshing with the lateral facial teeth.

The face engaging part 3 is used for associating with an article going to be connected and has a face engaging part 31 such as an engaging plate illustrated in the figures or prior art hanging hook attachments. A central facial hole 32 has a size corresponding to the outer hole 224 for the screw bar passing through. A facial ring 33 is integrally provided on the engaging part 31 and facial teeth 34 corresponding to the outer facial teeth 221 such that the facial teeth 34 can mesh with the outer facial teeth 221.

Figure 4:
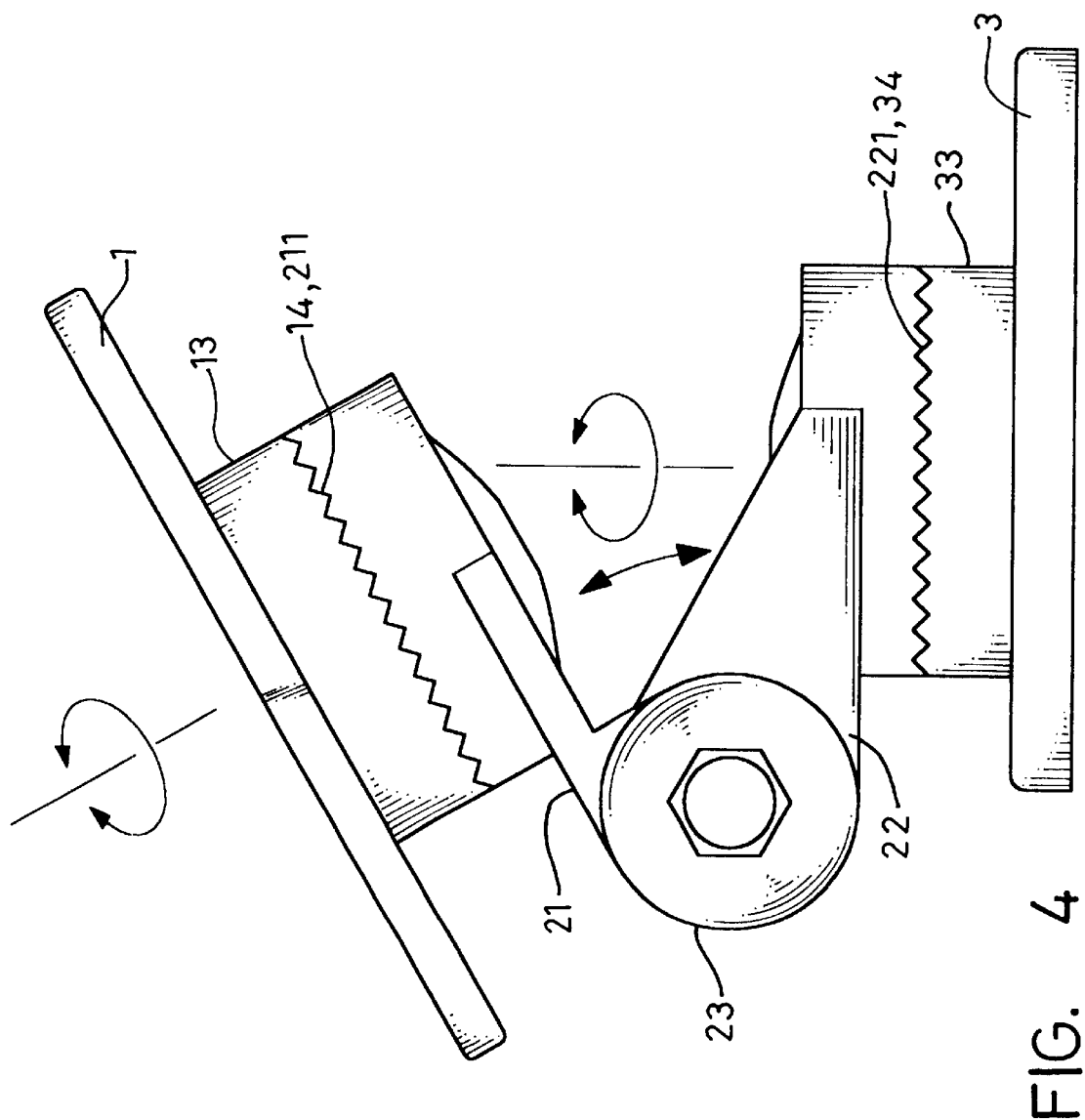
FIG. 4 is a plan view of the supporting frame in accordance with the present invention illustrating movement thereof.

Referring to FIG. 4 accompanying with FIGS. 1, and 2, the inner arm 21 and the outer arm 22 in the turnable arm 2 are engaged with each other. The teeth shaft 23 is attached to an end of the outer arm 22 and passed through and fastened by a screw bar. The outer teeth 221 meshing with the outer teeth 34 on the facial engaging part 3 and the outer cap 225 engaging with the outer arm 2 form the inner arm 21 and outer arm 22 rotating to each other relatively. But, all the meshed teeth have to engage with each other respectively assure the engaging frame in a state of being located. Because the base 1 and the face engaging part 3 are designed symmetrically, the base 1 and the engaging part 3 can be replaceable to each other.

As mentioned above, the inner chamber 212, the outer chamber 222, and the sleeve hole 218 of the inner arm 21 may receive a spring respectively to increase the friction force. But, it is possible that the spring may be or may be not used depending on the tightness of the two meshed teeth and the load applied on the engaging frame.

After assembling the adjustable supporting frame of the present invention, the base 1 can be mounted on a constantly stationary part such as a car body and the face engaging part 3 is associated with an article going to be connected such as a stand for a mobile phone. An adjustment around 360 degrees horizontally can be obtained by way of rotating the base 1 and the inner arm 21 to a specific location. An adjustment of a vertical elevation and an inclining location can be obtained by way of rotating the inner arm 21 and the outer arm 22. An adjustment of 360 degrees horizontally can be obtained by way of rotating the face engaging part and the outer arm 22 either. In this way, it is possible for the engaging frame to move spatially such that it is able to overcome the problems regarding a limited mounting space and a specific desired angular location.

Figure 3:
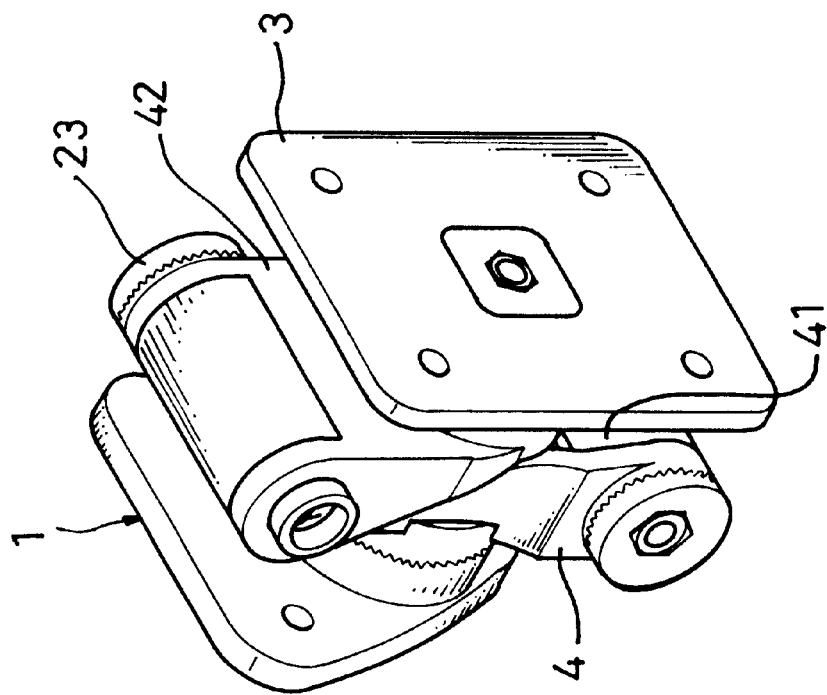
FIG. 3 is a perspective view similar to FIG. 2 illustrating an intermediate attachment adding in the supporting frame.

Referring to FIG. 3, an intermediate attachment 4 is used for adding the length of the engaging frame. Basically, an end of the intermediate attachment 4 is an inner intermediate part 41, which is similar to the outer arm 22 in the turnable arm 2, and an outer intermediate attachment 42 fits with the inner intermediate part 42 as the inner arm 21 and the outer arm do. The inner intermediate part 41 and the outer intermediate part 42 are engaged with each other by way of a teeth shaft. In other word, the inner arm 21 and the outer arm 22 are separated to fit with an outer intermediate part 42 and an inner intermediate part 41 respectively such that a lengthened portion is obtained to increase a joint for adjusting angular displacements and adjusting inclining locations. The inner intermediate part 41 and the outer intermediate part 42 may or may not receive a spring respectively as mentioned above and have teeth at a lateral side thereof respectively for meshing with each other. In addition, the inner arm 21 and the outer arm 22 are corresponding to each other such that it is possible to be interchanged the positions thereof and an identical effect will be maintained.

It is noted that an adjustable supporting frame of the present invention can be operated movements spatially such as rotating horizontally, moving upward and downward, and inclining an angle to fit a variety of requirements of space needed by a user. Additionally, an intermediate attachment can be mounted to adapt with a necessity of lengthened distance such that the function of the engaging frame can be enhanced advantageously. Hence, the adjustable supporting frame of the present invention offers superior connecting performance, which is not possible to be achieved by the prior art.

While the invention has been described with reference to preferred embodiments thereof, it is to be understood that modifications or variations may be easily made without departing from the spirit of this invention, which defined by the appended claims.

What is claimed is:

1. An adjustable supporting frame, comprising:

a base, being a connecting base, having a base hole at the center thereof, having a base ring at an outer surface thereof with base teeth surround an end edge of the base ring;

a turnable arm, further comprising an inner arm, at an end thereof having a size corresponding to the base ring and having inner engaging teeth to engage with the base ring by way of a screw rod, the other end of the inner arm having an inner sleeve with an inner through hole;

an outer arm, at an end thereof having engaging outer teeth with a central outer hole, at the other end thereof having an outer plate with a hole respectively, one of the outer plates having engaging teeth around a lateral side thereof; and a teeth shaft, having a cap at an end thereof with engaging teeth to engage with the teeth on the outer plate, and having an axial hole to be passed through by a screw rod to engage with the outer plates and the inner through hole; and a face engaging part, being a connecting face part with a central hole, the size of the central hole being corresponding to the outer hole to be engaged with the outer arm by way of a screw rod, and having a face ring with engaging face teeth to mesh with outer teeth.

2. An adjustable supporting frame as defined in claim 1, wherein the inner arm and the outer arm at the other end thereof further have an inner chamber and an outer chamber to receive a spring and be fastened by way of an inner cap with screw rod and an outer cap with screw rod, respectively.

3. An adjustable supporting frame as defined in claim 1, wherein the inner through hole in the inner sleeve may receive a spring.

4. An adjustable supporting frame as defined in claim 1, wherein an intermediate part may be mounted between the inner arm and the outer arm, an end of the intermediate part fits with the inner arm and the other end thereof fits with the outer arm, and both of the ends have engaging teeth to mesh with the inner teeth and the outer teeth respectively.

5. An adjustable supporting frame as defined in claim 4, wherein an end of the intermediate part is an intermediate inner arm with two apart locating plates, and the other end of the intermediate part is an intermediate sleeve with a spring therein.

6. An adjustable supporting frame as defined in claim 1, wherein the base and the face engaging part are interchangeable to each other.

* * * * *